Jan. 7, 1936.　　　　O. HACKER　　　　2,027,303
RUNNING GEAR
Filed Sept. 9, 1933　　　3 Sheets-Sheet 1

Oskar Hacker
INVENTOR

BY
ATTORNEY

Jan. 7, 1936.  O. HACKER  2,027,303
RUNNING GEAR
Filed Sept. 9, 1933   3 Sheets-Sheet 2
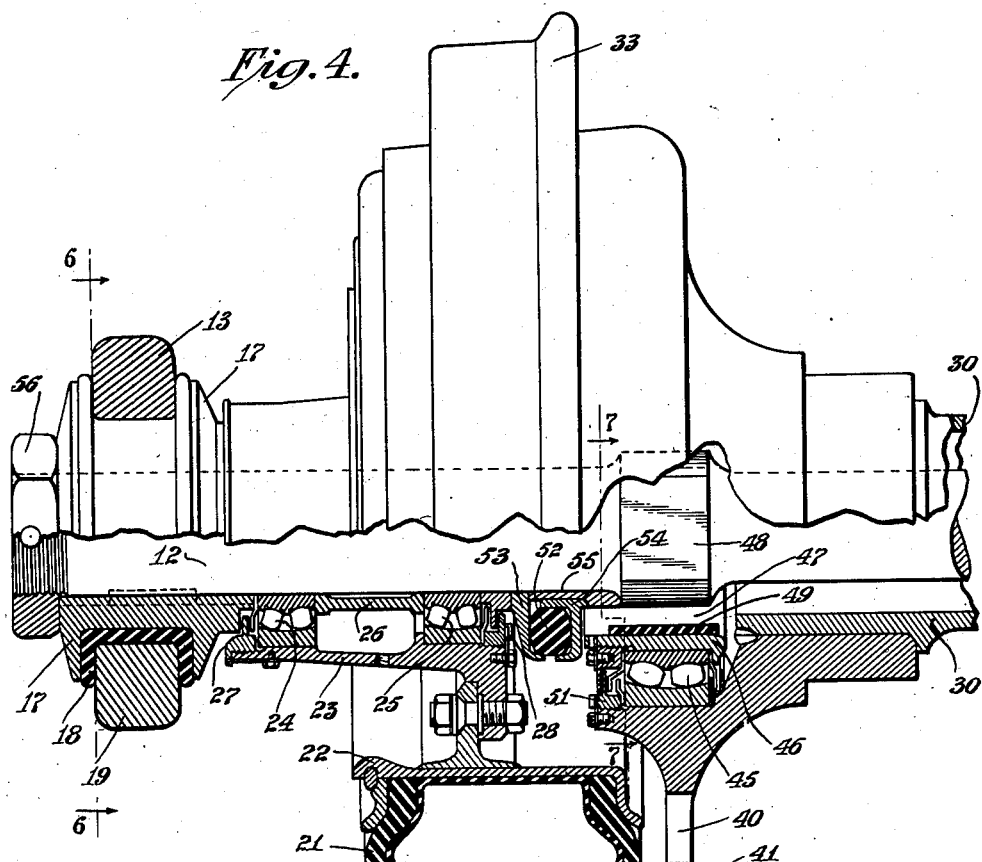
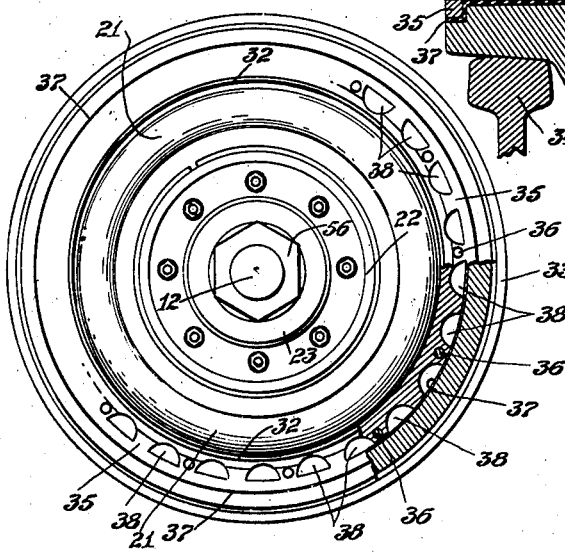
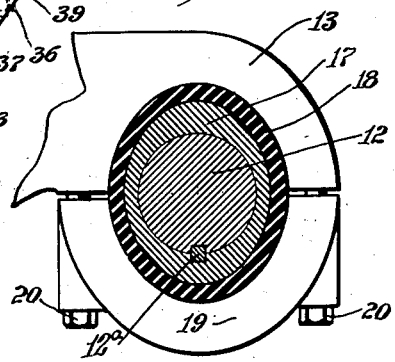
Oskar Hacker
INVENTOR
BY
ATTORNEY Jan. 7, 1936.   O. HACKER   2,027,303
RUNNING GEAR
Filed Sept. 9, 1933   3 Sheets-Sheet 3
Fig. 7.
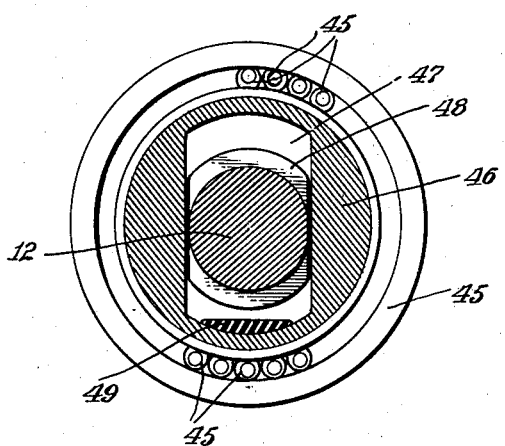
Fig. 8.
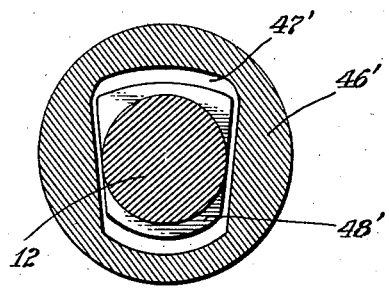
Fig. 9.
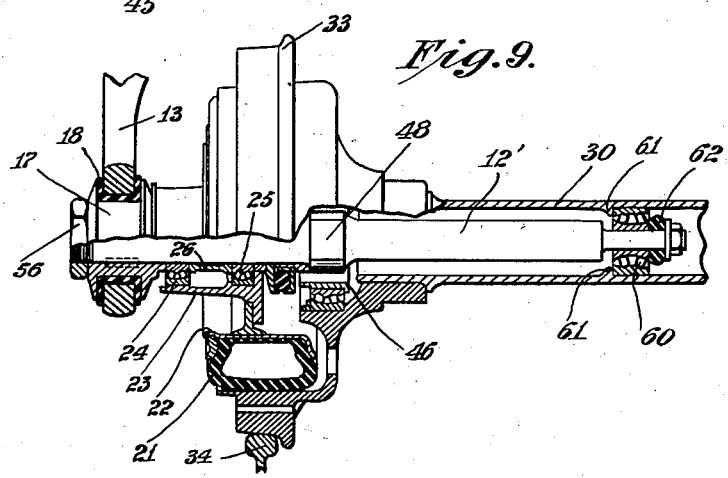
Fig. 10.
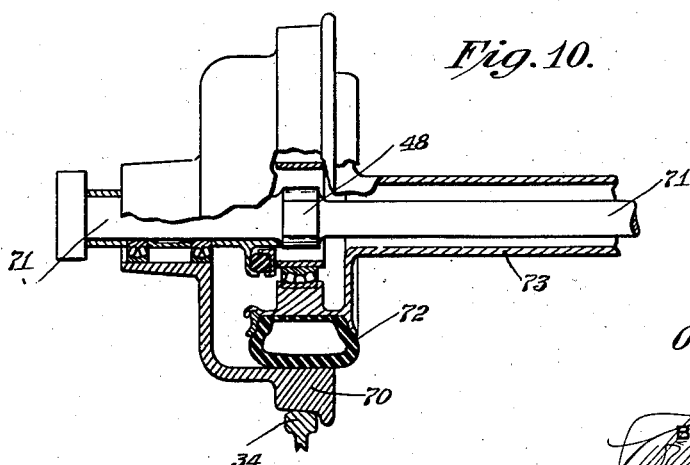
Oskar Hacker
INVENTOR
ATTORNEY Patented Jan. 7, 1936

2,027,303

UNITED STATES PATENT OFFICE 2,027,303

RUNNING GEAR

Oskar Hacker, Wiener-Neustadt, Austria, assignor to Austro-Daimler-Puchwerke A. G., Wiener-Neustadt, Austria, a firm Application September 9, 1933, Serial No. 688,734

16 Claims. (Cl. 295—3)

My invention relates particularly to the running gear of a vehicle intended to travel on rails. In railroad systems the life of the rails, road bed and rolling stock is very largely limited by the speed of operation of the cars to trains due to the fact that the vibrations set up in the materials employed increase with the square of the velocity of movement of the vehicle. It is highly desirable, therefore, to reduce to a minimum the vibrations transmitted by the road bed to the vehicle, and vice versa, those transmitted by the vehicle to the road bed.

In vehicles which travel without tracks the difficulties due to vibrations are largely overcome by the use of what are commonly termed pneumatic tires, that is, tires which themselves are resilient and depend principally upon air pressure to support the load.

The main object of my present invention is to provide simple and reliable means for utilizing the advantages of pneumatic tires in the support of rail guided vehicles.

To accomplish these advantages I employ a system embodying the principles of the invention of my former application 633,188, filed September 14, 1932. I have sought, however, in the present instance to reduce the weight, size and number of parts to a minimum and at the same time avoid any danger of damage due to the deflation of one or more of the pneumatic tires.

I have also sought to provide a construction of this character which is capable of withstanding the forces due to side play or centrifugal action as well as those due to the sudden starting and stopping of the vehicle.

A special object is to provide a construction of the foregoing character which leaves a maximum room for clearance of the road bed and attached parts and for the installation of motor and other elements on the vehicle itself.

In some installations, as for instance in street car practice and on narrow gauge roads, the space available beneath the floor of the car and between the tracks is quite limited. My present invention is especially adapted to these restricted conditions.

Another object is to provide an arrangement which will facilitate the removal of individual pneumatic tires or wheels.

Another object is to provide a system in which the combined resilient load wheels and road or track wheels can be readily removed as a unit.

In carrying out my invention, therefore, in the preferred form I employ wheels with pneumatic tires which are supported by and rotate upon stationary axles. Under normal running conditions the entire load is supported by these axles and pneumatic tires. As it is impracticable to have such pneumatic tires run directly upon the rails I provide what may be termed rolling or traveling roads which are interposed between the pneumatic tires and the rails. These are formed by wheels having rims whose outer surfaces correspond generally to the recognized standard railroad wheel practice.

Each of these metallic rimmed wheels or guiding wheels has an interior track or drum-like surface preferably slightly larger in diameter than the outside diameter of the pneumatic tire which runs in it. Two oppositely disposed guiding wheels are connected together by a tubular housing, axle, or shaft to form what may be called a guiding unit and the stationary axle which supports the pneumatic tired wheels extends through this hollow axle or guiding system. Normally this guiding system carries no load except the weight of its own parts. An intermediate bearing, however, is provided between each of the guiding wheels and the stationary axle of the pneumatic wheeled system which maintains the two axles in their proper relation but is only brought into play to support the vertical load in case of the deflation of a pneumatic tire to a point below a predetermined pressure. Resilient means is interposed between each load-carrying unit and its coacting guiding unit to take up lateral thrust due to centrifugal action of forces, for instance, when turning curves.

I have also provided a special system for distributing the load of the vehicle to the respective load-carrying axles and the pneumatic tires.

In the drawings I have illustrated the preferred form of the invention as applied to a four-wheeled truck. This may, however, be regarded as illustrating in principle running gear necessary for any vehicle. Certain features of the invention, however, are applicable to systems embodying any number of wheels, and certain features in fact are applicable to what are sometimes called self-laying track vehicles.

Fig. 4 is an enlarged sectional view showing one wheel combination and its associated axle parts.

Fig. 5 is a section and side view showing one of the wheels and its supporting axle.

Fig. 6 is a fragmentary detail showing the means for applying the load to one of the stationary axles.

Fig. 7 is a detail view showing the connection between the road wheel and the axle of the associated load wheel.

Fig. 8 is a view similar to Fig. 7 showing a modification of detail.

Fig. 9 is a fragmentary sectional view showing a modification of the details illustrated in Fig. 4.

Fig. 10 is a sectional view showing a similar section of another modification.

Figure 1:
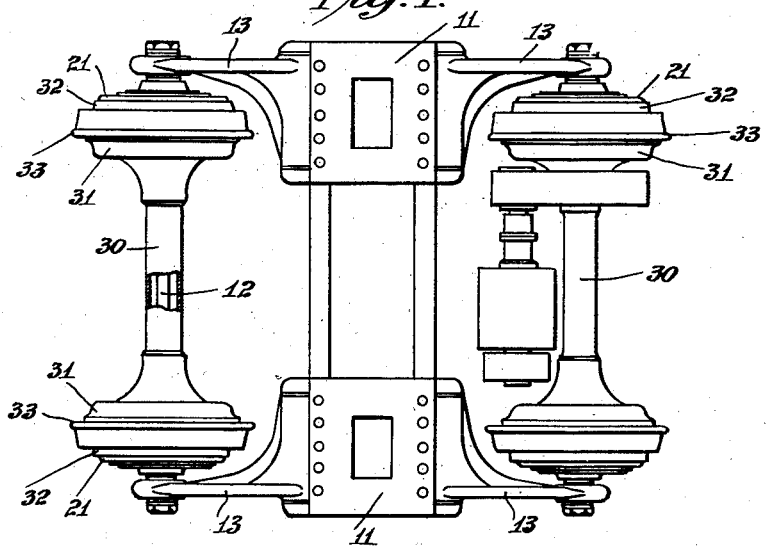
Fig. 1 is a plan view of running gear consisting of four wheels, embodying my invention.

The platform 11 represents the main load-carrying frame of the truck or vehicle. In the form shown there are two main axles 12, 12 and the load is distributed to the opposite ends of these axles by arms 13, 13 which are hinged at 14, 14 to the main frame and rest upon the ends of the axles. The spring 15 is supported beneath the platform 11 and has its opposite ends connected by links 16, 16 to intermediate portions of the respective arms. The connection of the arm 13 with the end of the shaft 12 is preferably effected through a sleeve 17 which is of irregular shape, such as oval, and secured to the shaft 12 by the key 12a shown in Fig. 6 so as to prevent its rotation.

Resilient damping material such as soft rubber 18 is interposed between the end of the arm and the sleeve 17 and the arm is held in place by a cap 19 and screws 20.

Figure 2:
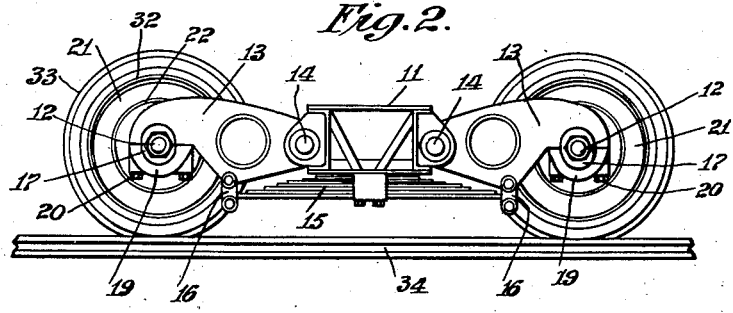
Fig. 2 is a side view of the same.
Figure 3:
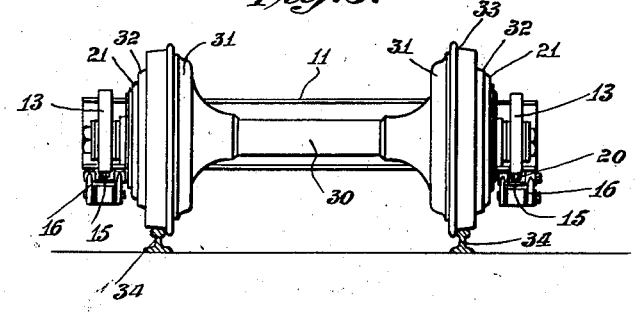
Fig. 3 is an end view of the same.

In the form shown in Figs. 1 to 7, it will be seen that each axle 12 has load applied to its opposite ends in such a manner as to permit independent vertical movement of each end of each axle.

A pneumatic tire 21 of any suitable character is carried by a rim 22 which is preferably detachably secured to a sleeve 23. This sleeve is rotatably supported on the axle 12 by means of roller bearings 24, 25 which are spaced apart from each other by a collar 26. These roller bearings may be of any suitable character and mounted upon the axle 12 in any suitable manner. Preferably grease and oil sealing bushings 27 and 28 are provided to prevent the escape of oil and grease. It will be seen that each of the pneumatic tired wheels is rotatable independently of the others.

The guiding unit or traveling road consists of a hollow axle 30 which connects two wheel members 31, 31 which are secured on opposite ends. Each wheel member 31 has a drum-like member or flange 32 which supports the pneumatic tire which is contained within it. A rim 33 shaped to run on the rail 34 is secured to the flange 32 of the wheel member 31 by means of a ring 35 and bolts 36. A layer of sound-deadening material 37 may be interposed if desired to prevent broadcasting of the sound vibrations due to contact of the rim 33 with the rail 34. Air ventilating passages such as 38, 39 and 40 are preferably provided in portions of the guiding wheel so as to prevent the parts from overheating and injuring the pneumatic tires.

From the foregoing it will be understood that the invention is applicable to either self-propelled or towed vehicles. Any suitable means may be provided for braking the wheels, as for instance by a brake member applied either to the rim 33 or to a projecting flange 41.

Power for propelling the vehicle can be applied either through the road wheel 31 or through the load wheel 21 in any suitable manner.

In order to prevent accident due to the deflation of a pneumatic tire I provide a special form of connection between the load axle and the road wheels, as shown particularly in Figs. 4 to 7. An anti-friction bearing 45 is mounted within each road wheel 31 and encloses a guiding ring 46. This guiding ring has a vertically elongated opening 47 which receives a smaller but correspondingly shaped enlargement 48 which forms a part of the axle 12.

This enlargement prevents the rotation of the guiding ring 46 but permits only the vertical movement of the load-carrying axle. Consequently the load is free to vibrate vertically without transmitting to or receiving from the road wheel any vibration. In case of deflation of a pneumatic tire the axle adjacent the deflated tire descends and carries with it the enlargement 48 which comes to rest in the bottom of the opening 47 in the guiding ring 46, thus transferring the load at that point to the road wheel which encompasses the deflated tire. A resilient pad 49 may be provided in the bottom of the opening 47 if desired so as to avoid any metallic supporting contact of the load. A suitable oil and grease sealing means 51 is preferably provided to protect the bearing 45 and also to prevent the application of oil and grease to the pneumatic tire.

To take up the lateral thrust between the load and the road wheels I provide a resilient buffer ring 52 which is interposed between each guiding ring 46 and an adjacent part of the load axle structure. This lateral buffer ring may be conveniently housed between two collars 53 and 54. A spacer sleeve 55 is interposed between the enlargement 48 and the ring 53 so as to limit the precompression of the buffer ring 52 when the nut 56 is tightened up to hold the parts together.

This arrangement permits of a limited longitudinal movement of the load axle with respect to the road axle resisted by the resilient character of the pneumatic tire and the balance or excess of lateral thrust is absorbed through the resiliency of the buffer ring 52.

The construction shown in Fig. 7, it will be seen, permits of substantially no movement of the load axle forward or backward with respect to the road or guiding axle. In Fig. 8, however, I have shown a modification in which the axle extension 48' is tapered and the recess or opening 47' is correspondingly tapered but somewhat larger so as to permit the relative vertical movement of the load axle within the guiding ring 46' and also permit a limited fore and aft movement of one axle with respect to the other. Such a construction may be desirable in some cases where a limited angular adjustment is wanted. In any case it will be seen that according to my system there is normally no metallic vibration-transmitting connection between the road bed and the load and that in case of deflation of a pneumatic tire beyond a predetermined amount the load is entirely removed from the deflated tire so that no damage can be done to it. The vehicle nevertheless is able to proceed without danger because the load is now carried by the road wheel instead of by the deflated pneumatic tire.

According to my invention I prefer to employ a pneumatic tire 21 which is slightly smaller in diameter than the drum 32 of the road wheel. Such a construction has peculiar advantages. It utilizes the pneumatic action to a maximum degree and at the same time ensures a maximum life to the pneumatic tire. Under favorable conditions the pneumatic tire actually rests in the drum 32 throughout a considerable portion of the circumference, such as 120°. This distributes the load over a wide area without distorting the pneumatic tire.

It is desirable, however, that there should be some clearance or at least no substantial pressure around the top and sides of the pneumatic tire to the extent of say 200°. This minimizes wear in the pneumatic tire and permits its maximum resiliency. It will also be seen that the bearing surface of the pneumatic tire, as viewed in Fig. 4, is materially wider than the supporting face of the rail 34. While this is not essential to the broader aspects of my invention, this construction has a material advantage in providing a more extended supporting surface which makes it possible to carry a much greater load upon a tire of a given size.

This arrangement also provides a much more effective braking surface since the tractive area of contact between the load tires and the track or guiding wheels is so much larger than is possible when the rubber tire contacts directly with the ground rail.

By the use of my invention I am able to avoid destructive vibrations which damage the road bed as well as the vehicle and the parts carried by it. This is especially important in high speed vehicles and those driven by electric motors which in ordinary vehicles suffer severe shocks from the vibrations due to rail joints, switches and curves.

According to my invention the shocks are preferably absorbed as close as possible to the point where they are created. Therefore the truck frame, the truck motor, if any, and other elements are substantially free from the influence of rail shocks.

With this construction it is easy to remove any of the pneumatic tires or an entire wheel after releasing the arm 13 which applies the load to its supporting axle. For this reason the spring support should be arranged so as to avoid interference with the removal of the tire. Similarly an entire combination of a main load axle with the assembled guiding axle and attached load and road wheels may be readily removed after disengaging the load arms 13, 13 which normally rest upon the load axle.

In the present form of the invention it will be seen that the arm 13 is so constructed and arranged that it is released by disengaging the cap 19 and the link 16 and then swinging the free end of the arm upwardly. In the broader aspect of the invention, however, I contemplate that the arm may be hinged to swing outwardly or made otherwise removable.

By arranging the axes of the shafts or axles 12, 12 and 14, 14 in substantially the same plane I eliminate very largely stresses tending to bend the parts when horizontal fore and aft pressures are brought into play.

In the modification shown in Fig. 9 the load-carrying axle 12' has one end supported by a bearing 60 within the tubular guiding axle 30. The enlargement 48 on the axle 12' is guided in a ring 46 in the same manner as shown in Fig. 7. Such a construction permits of a certain independent action of the load-carrying axles and therefore a reduction of the unsprung masses of the carrying system, and has certain advantages particularly for vehicles designed to travel at high speeds. The resistance to relative lateral movement may be taken up in this construction in a manner similar to that previously described.

Stop shoulders 61 may be provided to limit the pull-out movement of the bearing 60 and a soft rubber ring 62 may be interposed between the end of the load axle and the bearing 60 to resiliently check the pull-out movement of the load axle.

The construction shown in Fig. 10 embodies certain general principles of the constructions previously described. The guiding wheel 70 in this case is supported on the outer end of a stationary guiding axle 71 and the pneumatic tired wheel 72 is supported by a rotatable tubular load axle 73. Other features of construction are generally reversed with respect to the form first described. Such a construction has advantages in installations where it is necessary to drive the pneumatic tired wheels from a position between the rails. It will be apparent that in such a construction, however, it is desirable to connect the outer ends of the guiding axle in a manner similar to that employed in automobile practice to keep the guiding axle in a proper position.

The present invention is most generally useful when the load tires or wheels have suitable pneumatic tubes under air pressures. Certain features of the invention, however, may have special uses with other resilient tires such as solid rubber, cushion, or air chambered tires.

I claim:

1. Running gear comprising oppositely disposed track wheels, a rotatable tubular axle connecting said wheels, a load bearing axle extending through said tubular axle, a bearing for each wheel having a vertically sliding connection with said load bearing axle, pneumatically tired supporting wheels mounted to rotate on the outer ends of said load bearing axle and running within the track wheels 2. Running gear comprising a non-rotatable load axle, a rotatable tubular axle surrounding the load axle, a bearing ring interposed between said axles and normally bearing no vertical load, a track wheel carried by the tubular axle, a pneumatically tired wheel rotatably carried by the load axle and supported within the track wheel and a resilient buffer arranged to resist longitudinal movement of the load axle through said bearing ring.

3. Running gear comprising a tubular axle, an axle extending through the tubular axle, a track wheel carried by each end of one axle, a pneumatically tired wheel carried by each end of the other axle and running within one of the track wheels, bearing rings interposed between the two axles to prevent relative front and rear movement of the axles and adapted to sustain a vertical load when a tire is deflated.

4. Running gear as set forth in claim 3 having resilient means for limiting longitudinal movement of the two axles with respect to each other.

5. Running gear comprising a tubular outer axle, a track wheel rotatably mounted on each end of the outer axle, a non-rotatable inner axle, a resiliently tired wheel rotatably supported on each end of said inner axle and supported throughout at least 100° of its circumference within a track wheel, resilient buffers to limit the longitudinal movement of the inner axle within the outer axle and separate guiding means for limiting the forward and back and vertical movements between the axles.

6. Running gear comprising a track wheel having a tubular axle, a resiliently tired load supporting wheel mounted to run within the track wheel and having a non-rotating axle extending through the track wheel, a bearing ring interposed between the axles and a resilient buffer interposed between the bearing ring and the resiliently tired wheel.

7. Running gear comprising a tubular rotatable axle, track wheels carried by the opposite ends thereof and having interior drum surfaces, an inner axle extending through each track wheel, a resiliently tired wheel rotatably supported on each inner axle and traveling in the drum surface of a track wheel, a bearing for the inner end of each inner axle within the tubular axle permitting the outer end of the inner axle to rise and fall with respect to the outer end of the tubular axle and the supported track wheel and means for applying a load to the outer end of each of the inner axles.

8. Running gear comprising, a track wheel having a tubular axle, a load axle within the tubular axle, a resiliently tired load wheel traveling within the track wheel, and rotatably mounted with respect to the inner axle and an anti-friction bearing interposed between the hub of the track wheel and the inner axle.

9. Running gear comprising, a rotatable tubular outer axle and a relatively non-rotatable inner axle, a track wheel supported by one axle, a pneumatically tired load wheel traveling within the track wheel, an anti-friction bearing ring interposed between the hub of one wheel and the inner axle and a resilient buffer interposed between a part of said inner axle and said bearing ring.

10. Running gear comprising, a track wheel having a drum, a resiliently tired load wheel traveling within said drum, a tubular outer axle for said track wheel, an inner axle, a bearing member interposed between said inner axle and said track wheel, and two spaced-apart anti-friction bearings interposed between said inner axle and the hub of the load wheel.

11. Running gear comprising, a track wheel having a drum, a resiliently tired load wheel traveling within said drum, a tubular outer axle for said track wheel, an inner axle, a resilient buffer interposed between adjacent parts of the inner axle and the load wheel structure, a bearing member interposed between said inner axle and said track wheel, and two spaced-apart anti-friction bearings interposed between said inner axle and the hub of the load wheel.

12. Running gear comprising, a track wheel having a tubular axle, a load axle within the tubular axle, a resiliently tired load wheel traveling within the track wheel and rotatably mounted with respect to the inner axle, an anti-friction bearing interposed between the hub of the track wheel and the inner axle and a resilient buffer interposed between the bearing and the hub of the load wheel.

13. A vehicle running gear comprising a road wheel, a pneumatic tired load wheel within said road wheel, an axle for the load wheel extending through the road wheel in a manner to allow relative vertical movement between said axle and road wheel, and a device within said road wheel for limiting vertical movement of said axle and transmitting the load from said axle to the road wheel when the tired wheel is at least partially deflated, said device also being adapted to substantially eliminate forward and backward movement of the load axle within said wheel.

14. A vehicle running gear comprising a road wheel, a pneumatic tired load wheel within said road wheel, an axle for the load wheel extending through the road wheel in a manner to allow relative vertical movement between said axle and said road wheel, a device within said road wheel for limiting vertical movement of said axle and transmitting the load from said axle to the road wheel when the tired wheel is at least partially deflated, said device also being adapted to substantially eliminate forward and backward movement of the load axle within said wheel, and means also within the road wheel for transmitting axial thrusts between said axle and road wheel.

15. A vehicle running gear comprising a load axle, a resiliently tired wheel mounted on said axle, a road wheel surrounding said tired wheel and spaced from said axle to allow relative vertical movement therebetween due to vibrations, a normally inactive auxiliary support for said load axle within the road wheel for transmitting the load between said axle and road wheel when the tired wheel is at least partially deflated, said road wheel being axially inside the tired wheel and said auxiliary support being adapted to substantially eliminate forward and backwrd movement of the load axle within said road wheel.

16. A vehicle running gear comprising a load axle, a resiliently tired wheel mounted on said axle, a road wheel surrounding said tired wheel and spaced from said axle to allow relative vertical movement therebetween due to vibrations, a normally inactive auxiliary support for said load axle within the road wheel for transmitting the load between said axle and road wheel when the tired wheel is at least partially deflated, said road wheel being axially inside the tired wheel and said auxiliary support being adapted to substantially eliminate forward and backward movement of the load axle within said road wheel, and bearing means for normally transmitting axial thrusts between said axle and road wheel, said auxiliary support being adapted when in use to transmit at least some of said axial thrusts.

OSKAR HACKER.